E. S. COBB.
PROCESS OF PREVENTING FROST OR HEAT INJURY IN ORCHARDS, &c.
APPLICATION FILED APR. 22, 1919.
1,357,314. Patented Nov. 2, 1920.
3 SHEETS—SHEET 1.
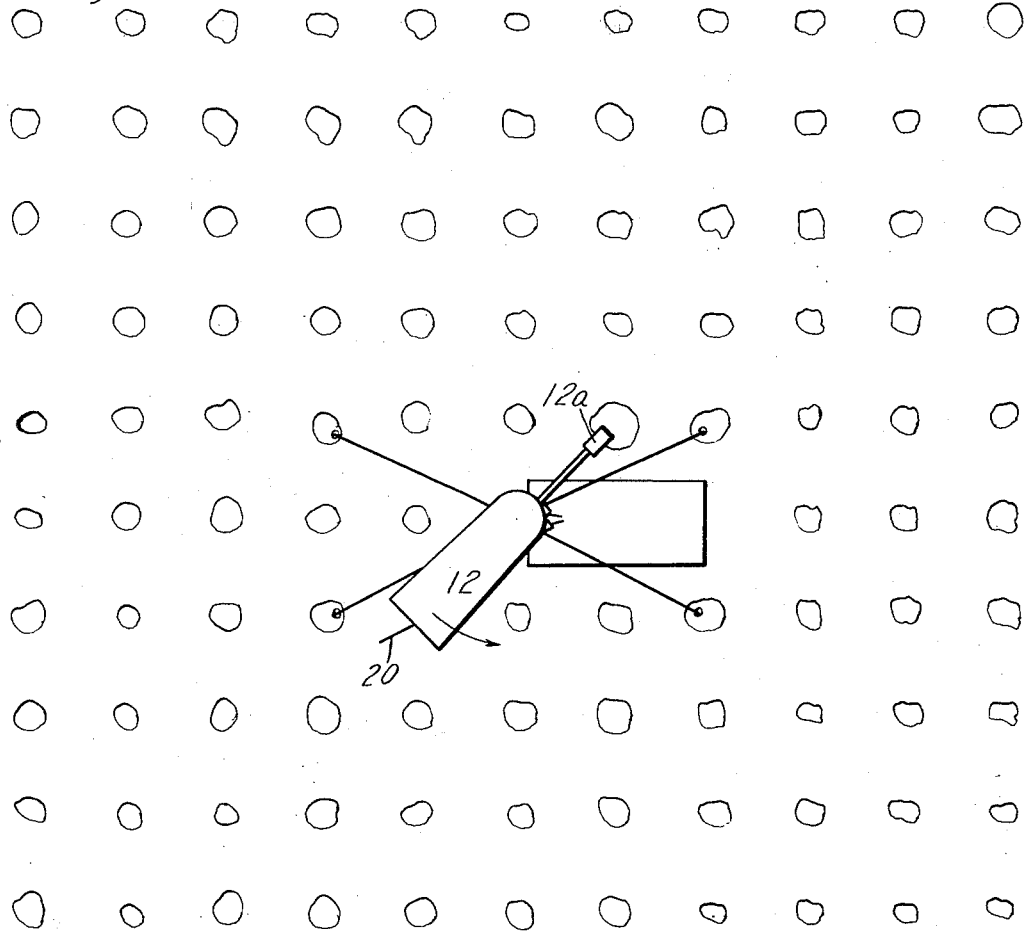
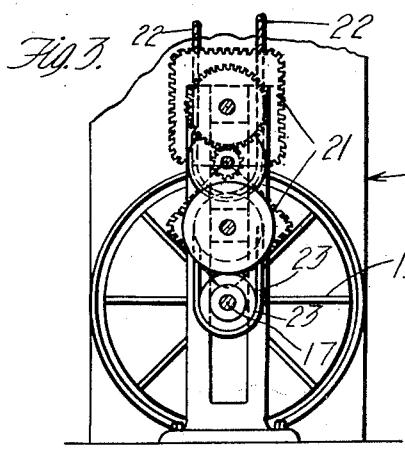
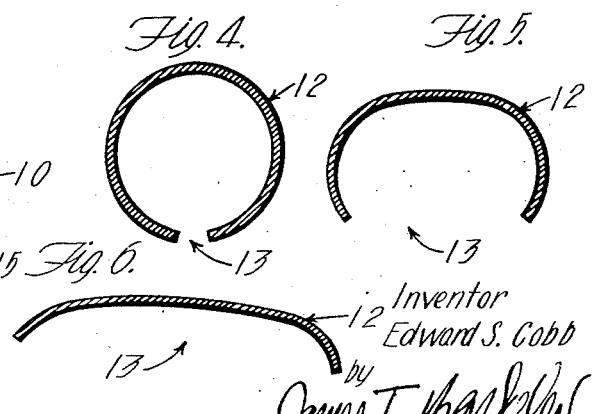
Inventor
Edward S. Cobb
by James T. Bachelor
his Attorney.

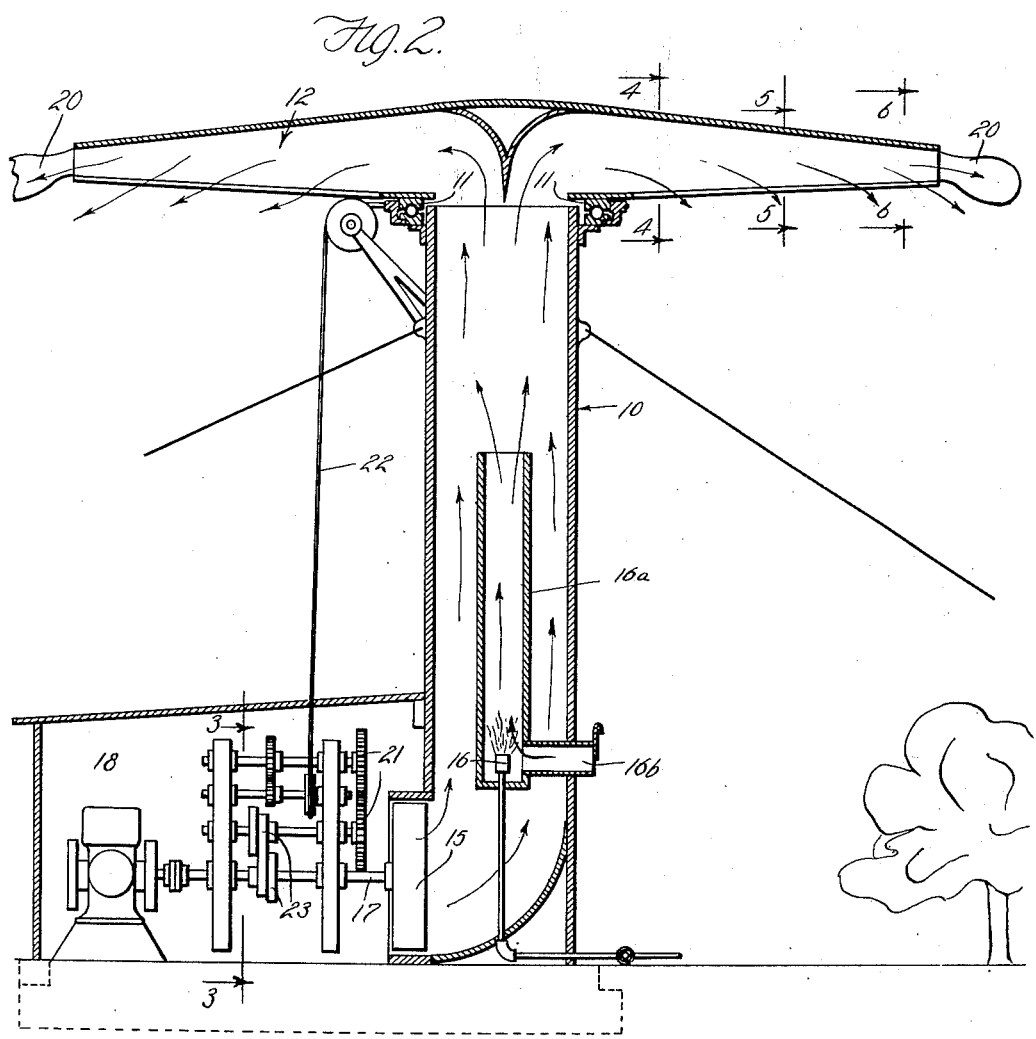

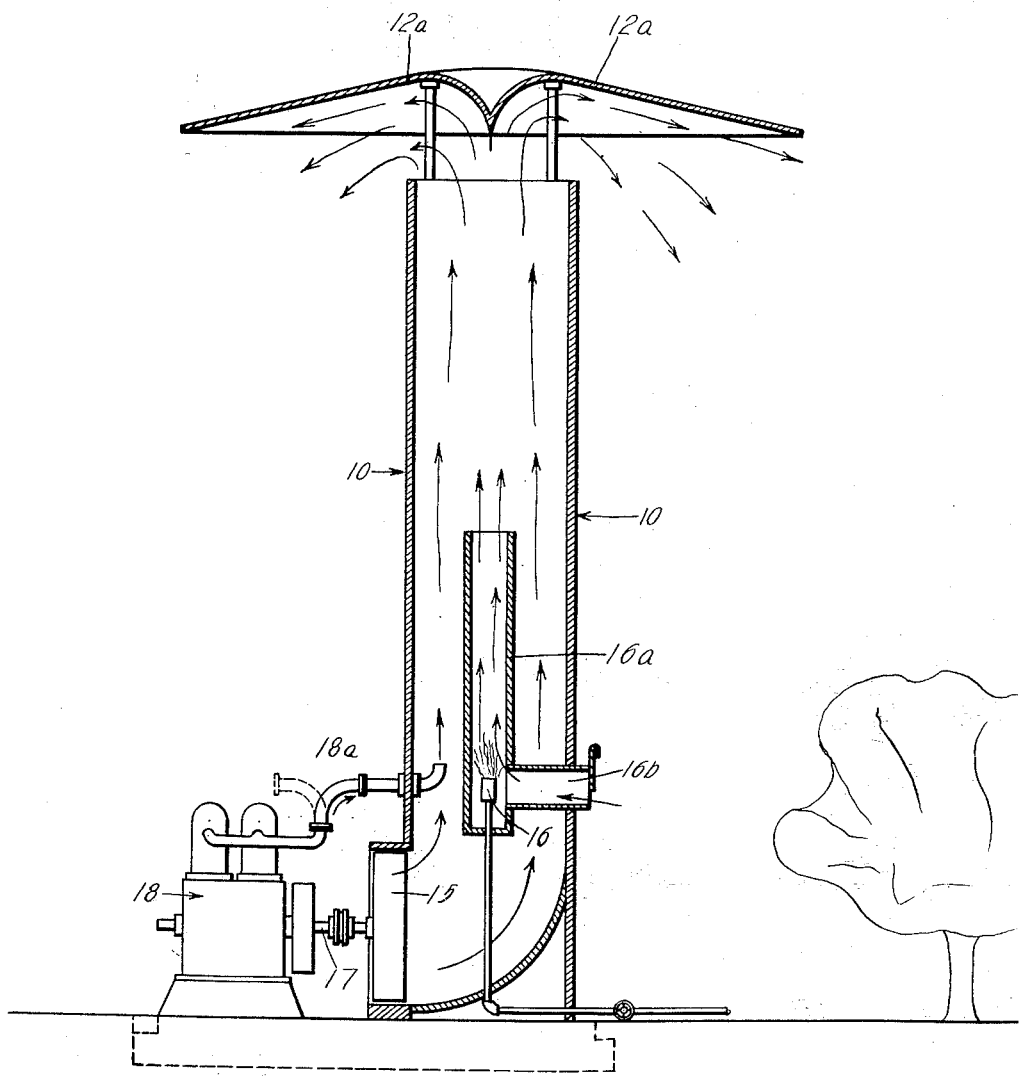

UNITED STATES PATENT OFFICE.

EDWARD S. COBB, OF WHITTIER, CALIFORNIA.

PROCESS OF PREVENTING FROST OR HEAT INJURY IN ORCHARDS, &c.

1,357,314.  Specification of Letters Patent.  Patented Nov. 2, 1920.

Application filed April 22, 1919. Serial No. 291,851.

*To all whom it may concern:*

Be it known that I, EDWARD S. COBB, a citizen of the United States, residing at Whittier, in the county of Los Angeles, State of California, have invented new and useful Improvements in Processes of Preventing Frost or Heat Injury in Orchards, &c., of which the following is a specification.

This invention has to do with a process or method of preventing injury in orchards and groves caused by excessively low or excessively high temperatures, to which orchards are at times exposed. This invention is more or less correlative to my apparatus invention which I have called "Frost preventer for orchards" and for which I have filed application Serial No. 277,899 on Feb. 18, 1919; and the present invention may be said to have for its general object the provision of a process or method which, independently of the use of any particular mechanism, will provide an efficient and economical procedure by which orchards, may be protected against low temperature and also against the burning effect of a hot, calm atmosphere.

I shall explain the situation which is more or less prevalent as regards citrus orchards, and shall explain particularly the application of my process to such orchards.

In by far the larger part of the districts in which citrus fruit is grown, there is a yearly recurrence of frost or freezing conditions injurious to the fruit and sometimes also to the trees; and there is also a fairly constant yearly recurrence of hot spells also injurious to the trees and highly detrimental to proper fruit production. Both these injurious conditions usually arise during calm weather—a moderate or brisk movement of the air usually prevents frost injury by preventing settlement of the cold air and preventing deposit of frost and usually also prevents heat injury. It is a more or less generally accepted fact among orchardists that movement of the air will prevent most of such injury to trees; that is, that the air movement is sufficient to prevent the frost or heat injury in all localities where climatic conditions are such as to make citrus fruit growing profitable.

It has been the universal custom in the past to supply heat in orchards by the use of smudge pots. In severely cold weather there must be used a smudge pot for each tree. In the clear calm weather which usually brings the injurious frost or freeze, the heat from smudge pots does not uniformly heat the atmosphere around the trees or the trees themselves; and if there is a brisk air movement during the cold spell, then the heated air is carried away from the immediately neighboring trees. Complete and perfect combustion is difficult to obtain in such smudge pots, with the result that smoke and smut is produced, which is objectionable and injurious. Artificial heat as thus applied by the means now universally used is therefore of doubtful utility even in cases where the cold is not particularly severe; and the use of smudge pots is to some extent at least objectionable.

Furthermore, individual pots scattered throughout an orchard or other plantation must of course be attended to; and, as a matter of practice, are inspected, and, usually, filled each day during the season when cold weather may be expected. This work, and the work of igniting the pots on the advent of cold weather, consumes a great deal of time and labor, as for citrus fruit the number of pots per acre runs from forty to ninety.

My process is aimed to overcome these difficulties herein stated, as well as many other difficulties not necessary herein to specifically point out. I do this by circulating air above and down into and around the trees of an orchard requiring protection; the source of such circulation being from a centralized point or points in the orchard, one center of circulation taking care of a comparatively large number of trees. Of course the exact number of trees taken care of by one operating plant is of no consequence, so far as the invention itself is concerned, but at present I prefer to make a plant of such dimensions and capacity as to be able to handle about ten acres of plantation—about 900 to 1000 citrus trees in a citrus orchard. From this central point I force a current of air out and down into the trees of an orchard in such a manner as to cause movement and circulation of the complete and entire body of air in and around the trees. Such a circulation as this, will, in most instances, prevent ordinary frost or freezing injury; and on an excessively hot day will prevent fruit injury. However, when the temperature falls to such a point, as it sometimes may, that simple circulation of the air does not suffice to prevent cold injury, then I heat this air which I send out from an elevated central point in the orchard; so as to positively supply heat to the orchard as well as keep the air in constant circulation. In such a centralized plant of large dimensions I may and do provide means for more nearly perfect combustion of the fuel than can be provided for in a large number of small combustion plants; with the result that the heated products of combustion which I send out, over and through an orchard are clean and not loaded with unconsumed carbon. And the temperature of the air (distributed uniformly) is entirely controllable; whereas with pots the temperature attained, or effectively attained at the trees, is variable and not fully controllable.

In order to make my process most fully intelligible, I shall now describe in detail preferred forms of apparatus for carrying on the process, reference for this purpose being had to the accompanying drawings, in which—

Figure 1 is a plan showing such apparatus (with a single director) in place in an orchard plot; Fig. 2 is an enlarged vertical section showing my device itself with a double air director; Fig. 3 is an enlarged detail section taken as indicated by line 3—3 on Fig. 2; Figs. 4, 5 and 6 are enlarged detail sections taken as indicated by lines 4—4, 5—5 and 6—6, respectively, on Fig. 2; and Fig. 7 is a view similar to Fig. 2 showing a modified form of apparatus.

In the drawings I show a vertical hollow column or stack 10 set upon any suitable foundation and which I set preferably centrally in the orchard. On the upper end of this stack, upon suitable bearings, as indicated at 11, I mount, either in a single or in a multiple form, a rotatable current directing member 12. The single form may be counterbalanced as shown at 12$^a$ in Fig. 1. The multiple form is balanced in itself. Such a member may very well be made of sheet metal bent to the configuration illustrated, and having on its under side a slot-like opening 13 which increases in width toward the ends of member 12. In fact, the member 12 flares out into a more or less fan-like shape; and the current of air which emerges from the slot is sent outwardly and downwardly so as to be distributed to every tree in the orchard, both far and near. By the gradually expanding slot on the lower side and the fan-shape of the distributer, these results are attained; air being directed more sharply downwardly at the inner part of the deflector, in comparatively less volume, and more nearly horizontally (but still downwardly) at the outer end of the deflector, but in comparatively larger volume. As the director 12 rotates, this current of air is directed to all the different parts of the orchard, and, passing through and around the trees, disturbs all of the air in and around the trees and thus causes a complete change of air in the trees once or more times for every revolution of the director. The director stands high enough above the trees to distribute air over them; so that the air currents going to the remote trees will not be stopped by nearer trees; thus also effecting a better distribution of air through the entire tree or bush.

I may utilize a power driven fan, as shown at 15, for the purpose of forcing air up through stack 10, and if I find it necessary I may utilize a burner 16, such as an oil burner, to heat the air in stack 10, the heated air and the heated products of combustion being thrown out of the stack together by the operation of fan 15. This burner may seldom be needed, only in case of extreme cold. It may be inclosed in a metal tube 16$^a$ to protect the stack (which may be of wood) and to deliver all the heat of fuel combustion to the current. Air may be admitted at 16$^b$ to tube 16$^a$, in regulated quantities, to give as nearly perfect combustion as possible in the tube. The fan is a large powerful one, being say of about 12 feet in diameter, the stack 10 being also of about the same diameter. Fan 15 may be driven directly by shaft 17 from a motor or engine 18. The size of the apparatus may of course be varied by such location, shape of ground and particular kind of plant growth the apparatus is to protect.

The air director 12 may be either driven mechanically from the engine 18 or it may be caused to rotate by the use of a vane or vanes 20 set on the end or ends of the director and in a position diagonal to the current of air; so that by reaction this vane or vanes will cause the director to rotate at a suitable speed of rotation. Or I may accomplish the same result by slightly twisting the end of the director, as is indicated in Fig. 6. However, it may be preferred to rotate the director positively by mechanical means, and in such case it is practicable to make the director move more slowly, as it is passing the diagonal of a square or rectangular field, (or, generally speaking, when it is passing a more distant point), and respectively, faster as it moves between diagonals; so that when the director is pointed in the direction of the far corners of the orchard, it moves more slowly so as to provide equal air current effect to the far corners as well as to the nearer sides. For this purpose I may utilize a driving mechanism which includes (for the case of a square orchard) a pair of square gears 21. The ultimate connection to the director may be made by a rope or cable drive as shown at 22; the proportions of the pulleys and of the gears being such that one complete rotation of a gear will always cause one complete rotation of the director, and the parts being set in such relations that the director moves fast and slow as hereinabove stated. Furthermore, the drive for the director may also include a variable speed driving arrangement as shown at 23, so that the director may be rotated at a slower or faster speed of rotation as may be desired to suit different circumstances arising.

It will be seen that in either single or multiple form the director member is counterbalanced, either by a special weight, or counterbalanced in itself. The construction is also made so that the director will always be balanced as regards wind pressure. The multiple form is so balanced in itself and the single form will have its counterbalance so constructed as to give equal resistance to wind pressure on opposite sides of the center.

In Fig. 7 of the drawings I show a modified form of apparatus equipped with a stationary deflector 12ᵃ at its top, instead of the rotating director hereinbefore described. Although for certain purposes I prefer the rotating director because it gives a more or less intermittent application of forced air movement to any one part of the orchard, yet for certain purposes the constant delivery of air downwardly and outwardly over and through all parts of an orchard, may be preferable. By using a simple deflector hood or head at the upper end of the stack, of circular or of such other shape as may be best suited to deliver air uniformly over an orchard of circular, square, oblong, or other configuration, I obtain a continuous distribution of forced air circulation over and through the orchard. In this case, as in the other case, the current of air is distributed outwardly and downwardly so as to reach all parts of the orchard, flowing over and into and around the trees from above, in the manner best calculated to effect the results herein spoken of. In such a case it is of course unnecessary to have any rotating mechanism, and the apparatus thus becomes much simpler, mechanically, than the construction first described herein.

If an internal combustion engine is used as motive power for the fan or other mechanism of the plant, its exhaust (indicated at 18ᵃ) may be very easily run into the stack, so as to give the heat of the exhaust to the air being distributed when heating is desirable; and may be turned aside out of and away from the stack when the apparatus is used to circulate unheated air as it would be the case when the calm hot days of summer make such operation desirable.

Now while I am aware that it has been before proposed to heat orchards by means of heat generated at a central heating plant, distributing the heat by means of steam or hot water; or by means of a central control of an extended burner system connected together by pipes or other means whereby the burning of spaced burners throughout an orchard may be controlled from a centralized point; yet I do not know of any prior process or arrangement wherein the system of my present invention has been proposed or used. In comparison with all prior proposals of which I am aware, one of the distinctive features of my invention is the distribution of air from a point above the trees, outwardly over and downwardly into and around the orchard. This method of procedure not only gives me the advantages of centralized control for a comparatively large area, but enables me to distribute, immediately from a single point, a circulation of air which is easily made and controlled to be uniform throughout the affected area. Distribution of air or of heated air and products of combustion, at a height below the tops of the trees, does not effect the desired result; because there is no opportunity to make a distribution upon a wide scale. Furthermore, such distribution of air, or of heated air and products of combustion, at a low elevation, will inevitably, especially in calm weather, merely set upward convection currents which have not only the tendency to carry the heated air upwardly away from the orchard but also has a tendency to draw in the cold air. In contradistinction to this method, my process delivers the air, either at its normal temperature or heated, outwardly and downwardly over and around and into and through the orchard, causing a thorough and yet comparatively gentle circulation of all of the air. Being able thus to keep up a proper circulation of the air, and at the same time to supply heated air to the orchard when necessary, I obtain both the advantages of enforced circulation and of artificial heat; and for that reason my process will prevent cold injury under temperature conditions lower than those which may be successfully coped with by smudge pots and the like.

Having described a preferred form of my invention, I claim:

1. A process of protecting orchards, consisting in directing a movement of air through the atmosphere outwardly above and downwardly into the orchard.

2. A process of protecting orchards, consisting in directing a movement of heated air through the atmosphere outwardly above and downwardly into the orchard.

3. A process of protecting orchards, consisting in directing a distribution of air through the atmosphere from a central point outwardly in all directions above the orchard.

4. A process of protecting orchards, consisting in directing a distribution of heated air through the atmosphere from a central point outwardly in all directions above the orchard.

5. A process of protecting orchards, consisting in the heating of air at a central point, and the distribution of such heated air from the central point outwardly and downwardly through the atmosphere above and into the orchard.

6. A process of protecting orchards, consisting in directing a distribution of air through the atmosphere above and into the orchard from a point above the trees or the orchard.

7. A process of protecting orchards, consisting in directing a distribution of heated air through the atmosphere above and into the orchard from a point above the trees of the orchard.

8. A process of protecting orchards, consisting in directing a distribution of air through the atmosphere above and into the orchard from a central point, such air being directed intermittently to any one place in the orchard.

9. A process of protecting orchards, consisting in directing a distribution of air through the atmosphere above and into the orchard from a central point, such air being directed progressively around the central point to different parts of the orchard.

10. A process of protecting orchards, consisting in the heating of air at a central point and then distributing such air through the atmosphere above and into the orchard from such central point located above the trees of the orchard.

11. A process of protecting orchards, consisting in the heating of air at a central point and then distributing such air through the atmosphere above and into the orchard from such central point located above the trees of the orchard, such distribution being directed intermittently to any one place in the orchard.

12. A process of protecting orchards, consisting in the heating of air at a central point and then distributing such air through the atmosphere above and into the orchard from such central point located above the trees of the orchard, such distribution being directed progressively around the central point to different parts of the orchard.

In witness that I claim the foregoing I have hereunto subscribed my name this 15th day of April 1919.

EDWARD S. COBB.

Witness:
 VIRGINIA BERINGER.